United States Patent Office 3,215,625
Patented Nov. 2, 1965

3,215,625
POLYMERIC LIQUID ANION EXCHANGE PROCESS
Herbert N. Dunning, St. Paul, and James M. White and Harold Wittcoff, Minneapolis, Minn., assignors to General Mills, Inc., a corporation of Delaware
No Drawing. Filed Nov. 21, 1962, Ser. No. 239,336
14 Claims. (Cl. 210—37)

This invention relates to a separative procedure and more particularly to a process utilizing polymeric liquid ion exchange agents.

Recently a method has been developed for the removal of anionic detergent and other anions from aqueous systems, particularly sewage and industrial wastes. Broadly, this method involves contacting the aqueous solution containing the anionic material with a solution of a liquid anion exchanger in an immiscible organic solvent. The anionic material is transferred to the organic phase and is absorbed by the anion exchanger. The aqueous phase and the organic phase are separated and the anionic material can be stripped from the organic phase by treating it with a base. Still more recently, the process has been developed for increasing the rate of transfer of the anionic material to the anion exchanger in the organic phase. It was found that if air or another inert gas is bubbled through the two phases that the anionic material will concentrate itself on the surface of the bubble and when the bubble enters the organic phase this concentrated detergent is transferred to the anion exchanger. This subject matter is included in United States application Ser. No. 201,149, filed June 8, 1962.

It will be apparent that one of the most important considerations in both of these processes is the nature of the anion exchanger employed. The present invention provides a new class of anion exchangers for removal of anionic constituents from water.

It is therefore an object of this invention to provide an improved ion exchange process. It is another object of this invention to provide an ion exchange process employing new anion exchange reagents. It is a further object of this invention to provide an anion exchange process which can be carried out at high pH's. It is still another object of this invention to provide a highly economic process for treatment of waste water. Other objects will appear hereinafter.

The objects of this invention are accomplished by a process which comprises contacting an aqueous solution of an organic anionic surfactant with a water-immiscible organic solvent solution of a polymer characterized by a recurring unit selected from the group consisting of:

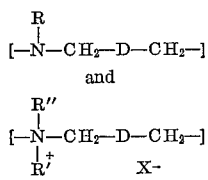

where D is a dimeric fat radical, R is selected from the group consisting of hydrogen, aliphatic radicals having 1 to 20 carbon atoms, and aryl radicals having 1 to 20 carbon atoms, R' and R" are selected from the group consisting of aliphatic and aryl radicals having 1 to 20 carbon atoms, and X is an inorganic salt-forming anion, and separating the resulting solutions. In accordance with the present invention it was discovered that these polymeric materials were highly effective liquid anion exchange reagents.

The polysecondary amines are characterized by the recurring structural unit:

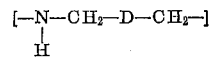

the polysecondary amines are conveniently prepared by the condensation polymerization of a fatty dinitrile derived from a dimerized fat acid. In addition to the homopolymer products prepared by the homo-condensation of a fatty dinitrile, copolymer polysecondary amine products can be prepared by the condensation copolymerization of a fatty dinitrile and a dinitrile copolymerizable therewith.

The condensation polymerization of the fatty dinitriles is accomplished by hydrogenating a fatty dinitrile under secondary-amine forming-conditions. By "secondary-amine-forming-conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

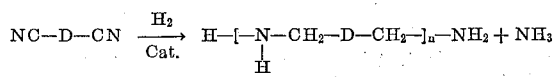

where D is a dimeric fat radical and $n$ is the number of recurring units in the polymer chain. As illustrated in the equation, an ammonia by-product is formed. In order to obtain optimum yields of the desired polysecondary amine product the ammonia by-product should be removed. Generally this is done by "sweeping" the reaction mixture with hydrogen gas.

Depending on the reaction conditions employed, the polymer products will vary in molecular weight from dimers in which $n$ in the foregoing equation is 2, to high molecular weight products in which $n$ is 40 or greater. The molecular weight of the polymer product can be varied by selection of the reaction conditions. Mild reaction conditions tend to produce lower molecular weight polysecondary amines while extremely severe reaction conditions produce insoluble cross-linked polymers. The lower molecular weight poly-secondary amines are readily pourable, viscous liquids which resemble a heavy sirup. They are generally pale amber in color and are readily soluble in most common organic solvents. As the molecular weight increases, the products are generally more viscous, less soluble and darker in color. Products in which $n$ is about 20 are extremely viscous and are difficult to pour even when heated.

A hydrogenation catalyst is employed to prepare the polysecondary amines. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the "Journal of the American Chemical Society," vol. 54, pages 138–45 (1932) and in "Reactions of Hydrogen with Organic Compounds over Copper-Chromium Oxide and Nickel Catalysts," by Homer Adkins, University of Wisconsin Press, Madison, Wisconsin (1937). The nature of this catalyst is further discussed in an article by Adkins, Burgoyne, and Schneider in the "Journal of the American Chemical Society," vol. 72, pages 2226–29 (1950). Commercially available copper-chromite catalysts often contain amounts of catalyst stabilizers, e.g., barium oxide, calcium oxide and magnesium oxide. Catalysts containing such stabilizers can be employed if desired. While many types of copper-chromite catalysts are commercially available and are generally useful in preparing polysecondary amines, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally, catalyst in the amount of 1 to 10% by weight, based on the weight of the nitrile charge, is sufficient for most purposes. Larger and smaller amounts of catalysts can be employed if desired.

The dinitrile starting materials for preparing the polymeric secondary amines are the dinitriles prepared from dimerized fat acids. Relatively pure dimerized fat acids can be distilled from commercially available polymeric fat acid mixtures. The term "polymeric fat radical" as used herein refers to the hydrocarbon radical of a polymeric fat acid. The term "polymeric fat acids" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behanic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthroquinone, sulfur dioxide and the like. Suitable monomers include the branched and straight chain, poly- and mono-ethylenically unsaturated acids such as 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scolinodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid and mixtures thereof are the preferred starting materials for the preparation of the polymeric fat acids. The dimerized fat acid is then converted to the corresponding dinitriles by reacting the dimerized fat acid with ammonia under nitrile forming conditions. The details of this reaction are set forth in Chapter 2 of "Fatty Acids and Their Derivatives," by A. W. Ralston, John Wiley & Sons, Inc., New York (1948). If desired, the dinitrile may then be purified to the desired degree by vacuum distillation or other suitable means. Generally, the high purity dinitrile tends to produce linear polysecondary amines of high molecular weight. If appreciable amounts of mononitrile are present, the polymer will be of low molecular weight, since these materials act as chain stoppers. The presence of trinitriles and other higher polyfunctional nitriles tends to produce a cross-linked polymer. A sufficient amount of trinitriles will produce a gelled product.

Copolymeric polysecondary amines can be prepared by copolymerizing mixtures of dinitriles. The desired dinitrile comonomer is added to the reaction mixture along with the fatty dinitrile. After subjecting the mixture to polymerization conditions, there is obtained a polysecondary amine copolymer having randomly distributed recurring units:

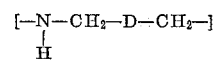

and

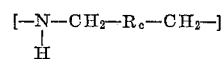

where D is a dimeric fat radical and $R_c$ is a divalent radical derived from the comonomer dinitrile. Generally, any copolymerizable dinitrile can be employed. Specific examples of simple dinitriles which can be employed as comonomers include the dinitriles derived from such acids as adipic acid, pimelic acid, suberic acid, azelaic acid, and sebacic acid. Mixtures of two or more fatty dinitriles can also be copolymerized. A large variety of other dinitriles are likewise useful.

In theory, the formation of the polymeric secondary amine proceeds through the preliminary reduction of the nitrile to the primary amine followed by conversion of the primary amine to the polymeric secondary amine. Accordingly, this provides an alternate route for the preparation of the polymers. In the alternate route, the polyamines are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in carrying out the preparation of the polymeric secondary amines in two steps since it makes possible the removal of any by-products formed in the first step, i.e., the formation of the primary amine and thus enhances the purity of the final product. In addition, the milder conditions used to form the polymeric secondary amine from the di-primary amine results in less degradation and thus further enhances the purity of the product.

Generally, the end groups of the polymers of the polymeric secondary amine will be either amine groups or nitrile groups. Where the polymers are prepared by condensing amines, all the end groups will be primary amines:

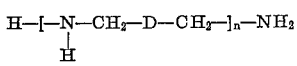

where D and n are as previously defined. Where a dinitrile is used as the starting material and the reaction conditions are mild and the reaction itmes are short, the end groups will be mainly nitrile groups:

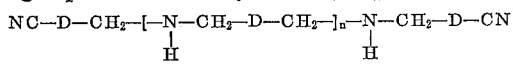

where D and n are as previously defined. When dinitriles are used as the starting material, under many reaction conditions a mixture of polymers will be obtained, some chains terminating in nitrile groups and other chains terminating in amine groups. Where severe reaction conditions are utilized, the degradation of functional groups may cause some chains to terminate in hydrocarbon groups.

The preparation of the polysecondary amines will be better understood by reference to the following examples. Unless otherwise specified, all parts and percentages used herein are by weight.

EXAMPLE A

Into a 1 liter stirred autoclave were charged 417 grams of distilled dimer nitrile prepared from dimerized linoleic acid and 10 grams of water-wet Raney nickel catalyst. The autoclave was flushed with hydrogen, sealed under 150 p.s.i.g. hydrogen and rapidly heated to 200° C., at which time a continuous venting of hydrogen was begun such that the hydrogen coming into the autoclave was at 240 p.s.i.g. and the actual pressure in the autoclave was approximately 230 p.s.i.g. Heating was continued until the desired reaction temperature of 270° C. was reached. The hydrogenation was continued at this temperature for a period of 1⅓ hours. The reaction mixture was then cooled to below 200° C. and the catalyst was removed by filtration. There was obtained a product having a Brookfield viscosity of 114 poises at 25° C., a molecular weight of 4600 and an inherent viscosity of 0.165 as measured on a 0.5% solution in meta-cresol. Infrared analysis indicated that no nitrile groups were left in the product. The product contained 12.4% primary amine groups, 72.7% secondary amine groups, and 5.5% tertiary amine groups.

EXAMPLE B

Example A was repeated except 21 grams of a commercially available copper-chromite catalyst "G-13," manufactured by The Girdler Company, of Louisville, Kentucky, was substituted for the Raney nickel catalyst of Example A. There was obtained a product having a Brookfield viscosity of 4220 poises at 25° C., a molecular weight of 10,100 and an inherent viscosity of 0.262 as measured on a 0.5% solution in meta-cresol. The product contained 8.0% primary amine groups, 84.4% secondary amine groups, 5.1% tertiary amine groups, and no nitrile groups.

EXAMPLE C

Example B was repeated except that the reaction was run at 250° C., for a period of 5⅓ hours. There was obtained a product having a Brookfield viscosity of 6200 poises at 25° C., a molecular weight of 11,000, and an inherent viscosity of 0.335 as measured on a 0.5% solution in meta-cresol. The product contained 6.5% primary amine groups, 85.9% secondary amine groups, 5.7% tertiary amine groups, and no nitrile group.

EXAMPLE D

Example B was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

EXAMPLE E

Into a 1 liter stirred autoclave were charged 400 grams of crude undistilled dimer nitrile prepared from vacuum stripped dimerized linoleic acid, and 100 grams monomer nitrile prepared from the recovered monomeric acid obtained from the polymerization of linoleic acid, and 25 grams of copper-chromite of Example B. After hydrogenation at 280° C. for 1⅓ hours, there was obtained a product having a Brookfield viscosity of 241 poises at 25° C., 6.9% primary amine groups, 81.2% secondary amine groups, 5.6% tertiary amine groups, and 2.8% nitrile groups.

EXAMPLE F

A crude undistilled dimer nitrile prepared from vacuum stripped dimerized linoleic acid was treated with a mixture of copper-chromite catalyst recovered from the reaction mixture of a previous successful hydrogenation and diatomaceous earth. The level of catalyst used in this pretreatment was about 5% by weight, based on the nitrile. The dimer nitrile was recovered by filtration. Into a 1 liter stirred autoclave were charged 442 grams of the treated dimer nitrile and 21 grams of the copper-chromite catalyst of Example B. After hydrogenation at 280° C. for 1⅓ hours, there was obtained a product having 9.2% primary amine groups, 71.9% secondary amine groups, 5.8% tertiary amine groups, and 5.6% nitrile groups. The product had a Brookfield viscosity of 639 poises at 25° C. and a molecular weight of 4200.

EXAMPLE G

A crude undistilled dimer nitrile prepared from vacuum stripped dimerized linoleic acid was washed with 1.5 grams of sodium hydroxide which had been dissolved in ethanol. After separating the solutions, 400 grams of the treated dimer nitrile and 20 grams of the copper-chromite catalyst of Example B were charged into 1 liter autoclave. After hydrogenation at 280° C. for 1½ there was obtained a product having a molecular weight of 3000, a Brookfield viscosity at 25° C. of greater than 20,000 poises and a Brookfield viscosity at 60° C. of 1,260 poises. Analysis of the product indicated that it had 15.8% primary amine groups, 60.7% secondary amine groups, 9.4% tertiary amine groups, and no nitrile groups.

EXAMPLE H

Into a 1 liter stirred autoclave were charged 530 grams of a distilled dimer nitrile having an iodine value of 8.5 prepared from a distilled dimer acid essentially saturated by hydrogenation having an iodine value of 8.4 and 25 grams of the copper-chromite catalyst of Example B. After hydrogenation for 3 hours at 270° C. there was obtained a product having an apparent molecular weight of 5,800, an iodine value of 10.3, a Brookfield viscosity of greater than 20,000 poises at 25° C., and a Brookfield viscosity of 2,240 poises at 60° C. The product contained 9.6% primary amine groups, 76.7% secondary amine groups, 5.4% tertiary amine groups, and no nitrile groups.

EXAMPLE J

Example H was repeated except that 9.6 grams of methanol-wet Raney nickel was used as a catalyst for 400 grams of nitrile. After hydrogenation at 270° C. for 1⅓ hours, there was obtained a gelled product.

EXAMPLE K

Into a 1 liter stirred autoclave were charged 405 grams of distilled dimer nitrile prepared from dimerized lineolic acid, 81 grams of adiponitrile, and 25 grams of the copper-chromite catalyst of Example B. After hydrogenation at 270° C. for 2 hours, there was obtained a copolymer product having 6.3% primary amine groups, 49.6% secondary amine groups, 18.1% tertiary amine groups, a Brookfield viscosity of 338 poises at 25° C., and a Brookfield viscosity of 60 poises at 60° C.

EXAMPLE L

Example A was repeated except that the hydrogenation was carried out at a reaction pressure of 90 p.s.i. for 4 hours at 232 to 248° C. using 10 g. of methanol-wet Raney nickel catalyst. There was obtained a product having 1% primary amine groups, 72.3% secondary amine groups, 6.1% tertiary amine groups, 11.8% nitrile groups, an iodine value of 83.4, and a Brookfield viscosity of 660 poises at 25° C.

EXAMPLE M

Into a 1 liter stirred autoclave was charged 300 grams of a distilled dimer diamine having a total amine number of 205.1 as compared to theoretical value of 204.2 which was prepared by hydrogenating dimer nitrile in the presence of ammonia, and 12 grams of methanol-wet Raney nickel catalyst. After hydrogenating the mixture for 2 hours using the conditions of Example A, there was obtained a polymeric product having 23.3% primary amine groups, 69.5% secondary amine groups, 4.8% tertiary amine groups, and a Brookfield viscosity of 65.2 poises at 25° C.

EXAMPLE N

Into a 1 liter stirred autoclave was charged 68 grams of metaxylylene diamine, 921 grams of the distilled dimer diamine of Example L, and 10 grams of the copperchromite catalyst of Example B. After hydrogenating for 1⅔ hours using the reaction conditions of Example A, there was obtained a copolymeric product having an amine number due to secondary amines of 117.8. In comparison, the product of Example L had an amine number due to secondary amines of 76.6 and the product of Example C had an amine number due to secondary amines of 90.3. The higher amine number for the product of this example indicates a larger weight percent of secondary amine groups due to formation of the copolymer.

The foregoing examples have been included as illustrations of the preparation of polysecondary amines and are not to be construed as limitations on the scope of the present invention.

The alkylation of a polysecondary amine to a polytertiary amine is conveniently carried out by treatment of the polysecondary amine with an organic halide and aqueous sodium hydroxide. The type of organic halide is not critical; all aliphatic and aromatic halides are generally useful. The sodium hydroxide absorbs and neutralizes the hydrochloric acid by-product of the reaction, thereby forcing the reaction to completion. Other bases, such as potassium hydroxide, barium hydroxide and sodium bicarbonate can be substituted for the sodium hydroxide if desired. Generally it is preferred to carry out the alkylation at a temperature of about 20 to 150° C.

The number of equivalents of the organic halide employed should be approximately equal to the number of amine groups of the polysecondary amine which are to be alkylated. Preparation of polymers containing both secondary and tertiary amine groups is accomplished by using smaller amounts of organic halide.

Examples of organic halides which can be employed include methyl chloride, ethyl chloride, butyl chloride, hexyl chloride, decyl chloride, stearyl chloride, 1-hexenyl chloride, cyclohexyl chloride, oleyl chloride, linoleyl chloride, 1-decenyl chloride, benzyl chloride chlorobenzene, 3 - chloro - 1,2-dinitrobenzene,1-chloro-4-fluorobenzene, methyl iodide, ethyl bromide, decyl bromide, chloronaphthalene, 1,4-dichlorobutene-2, dichlorobenzene, 1-chlorodecalin and, $\beta,\beta$-dichloroethyl ether. Acetylenically unsaturated organic halides can be employed if desired, although they are generally not preferred because of high cost and comparative unavailability. The dihalides tend to produce cross-linked products.

The preferred organic halides are the alkyl and alkenyl chlorides and bromides of 1 to 20 carbon atoms; these provide substituents of alkyl or alkenyl radicals of 1 to 20 carbon atoms.

If the desired amino substituents are methyl groups, the standard formaldehyde-formic acid methylation reaction can be employed. In this reaction formaldehyde is added to the amine group replacing the active amine hydrogens thereby forming a hydroxymethyl radical. The formic acid converts the hydroxymethyl group to a methyl radical thereby forming the desired product. Higher carbon substituents can be introduced into the polysecondary amine by substituting a higher aldehyde for the formaldehyde.

If the end groups of the polysecondary amine are amine groups, they generally will be alkylated.

The preparation of polytertiary amines will be better understood with reference to the following examples. Unless otherwise indicated, all parts and percentages are by weight.

EXAMPLE O

To a 1 l. stainless steel autoclave were charged 387 g. of a polymeric fatty secondary amine having a molecular weight of 3100 as determined by end group analysis prepared according to the procedure of Example G., 50 g. distilled water, 50 g. isoproponal, 30.4 g. of paraformaldehyde and 42.0 g. of 90%, formic acid. The autoclave was sealed and heated to 115° C., the by-product water and carbon dioxide gases were vented intermittently to hold the pressure at 250 p.s.i.g. After one hour at 115° C., the autoclave was cooled to 50° C. and vented to zero pressure. Approximately an equal volume of a solvent mixture containing 2 parts of butanol and 1 part of toluene was added along with 300 ml. of aqueous sodium hydroxide solution containing 0.825 equivalent of sodium hydroxide. After shaking, the lower alkaline aqueous phase was withdrawn and the upper organic phase was washed with distilled water until free of dissolved salts and sodium hydroxide. The organic layer was dried by filtering through anhydrous sodium sulfate and stripped free of solvent. There was obtained a pale, clear, light amber colored, viscous liquid having a total amine number of 98.9 and a tertiary amine number of 95.4. This indicates that 96.5% of the amine groups were tertiary.

The quaternization of the polysecondary amines to polyquaternary ammonium compounds is carried out by treatment of the polysecondary amine with an excess of organic halide and aqueous sodium hydroxide or other base. If it is desired to prepare polyquaternary ammonium compounds having mixed substituents, the polysecondary amine is first alkylated with one organic halide to form a polytertiary amine and then quaternized with a second organic halide.

Bases suitable for the reaction are generally suitable for the quaternary reaction. Examples of suitable bases are listed hereinbefore.

If less than two equivalents of organic halide are employed for every amine group in the polysecondary amine there is obtained a polymer having a mixture of quaternary ammonium groups and tertiary amine groups.

The organic halides useful in the quaternization reaction are generally the same as those employed in the above-described alkylation reaction. The specific organic halides mentioned above are useful in the quaternization reaction.

If the end groups of the polysecondary amine are amino groups, they generally will be quaternized along with the amino groups within the polymer chain.

In order to illustrate the preparation of the polyquaternary ammonium compounds, the following examples are

EXAMPLE P

Into a 1 liter stirred autoclave were charged 63 grams of a polysecondary amine having molecular weight of approximately 1400, prepared according to procedure of Example G, 237 grams of isoproponal, and 30 grams of sodium bicarbonate. After heating the reactor to 100° C., methylchloride was added to the reactor to provide a pressure of 100 p.s.i. As the reaction progressed and carbon dioxide was formed therefrom, the reactor pressure increased considerably. Occasionally, the reactor was vented to 100 p.s.i. or slightly below in order to remove some of the carbon dioxide formed. Methylchloride under a pressure of 100 p.s.i. was continually fed into the chamber. After two hours, the reactor was cooled, vented and the contents filtered and concentrated by evaporation to give a clear polyquaternary ammonium chloride having a preamine content of 1.6%, an amine hydrochloride content of 0, a chloride content of 2.8 and a percent solids of 39.8.

EXAMPLE Q

Using substantially the procedure of Example J there were charged to the 1-liter pressure reactor 100 grams of a polysecondary amine prepared according to the method of Example A, 300 grams of isoproponal, and 47.5 grams of sodium bicarbonate. After heating at 100° C. for 2¾ hours, there was recovered a solution of a polyquaternary ammonium chloride having a free amine content of 0.5, amine hydrochloride of 0%, a chloride content of 2.37%, and 30.0% solids.

EXAMPLE R

Using the procedure of Example J there were charged to a 1-liter pressure reactor, 100 grams of a polysecondary amine prepared according to the method of Example C, 300 grams of isoproponal, 47.5 grams of sodium bicarbonate, and 2 grams of sodium hydroxide. After reacting at 100° C., in a 100 p.s.i. for 6¾ hours there was recovered a solution of a quaternary ammonium chloride having a free amine content of 1.6%, an amine hydrochloride content of 0%, chloride content of 2.13%, and 29.2% solids.

When sewage and industrial wastes are treated by the process of the present invention, organic anionic surfactants are separated, and in addition there generally occurs a reduction of biochemical oxygen demand, chemical oxygen demand, suspended solids, and dissolved solids such as fatty acids, greases, oils, and the like. These benefits are sometimes of great importance.

The term "anionic surfactant" as used herein means an anionic material which is capable of exhibiting surface active properties. The term "water-immiscible organic solvent" refers to an organic material normally liquid which is substantially, but not necessarily entirely, insoluble in water. Ion exchange materials are commonly designated by the type of ion which is absorbed, rather than by the chemical properties of the ion exchange material. Accordingly, the materials used herein would be referred to as anion exchange materials. The type of ion exchange involved herein is referred to commercially as "liquid ion exchange." The "liquid" refers to the fact that in this type of ion exchange process the ion exchange agent is used in solution rather than in a solid state as is the case with ion exchange resins. When the ion exchange agents of the present invention are dissolved in a suitable solvent there is formed a solution which has ion exchange properties.

The preferred organic solvents for the process of the present invention are the hydrocarbons. Examples of suitable hydrocarbon solvents include isooctane, kerosene, "Soltrol 170," a commercially available naphthenic hydrocarbon solvent, benzene, toluene, xylene, isodecane, fuel oils, mineral oils, hexane, heptane, and octane. Solvents which contain functional groups can also be employed in the present invention, providing that the functional groups do not adversely affect the extraction, and provided that the molecular weight is sufficiently high so as to make the organic solvents substantially insoluble in water. Illustrative of such compounds are the alcohols, aldehydes, ketones, and esters such as naturally occurring vegetable oils.

Generally, any organic materials which exhibit anionic properties can be separated by the present invention. It should be clearly understood that the process can be used to recover materials not generally used as surfactants as long as the material is anionic. Surface active properties greatly facilitate separation but are not required in several practices of the process. It should be noted that many natural wastes, or their degradation products fall into this classification; the fatty acids, carboxylic acids in general such as acetic, propionic, butyric, valeric, stearic, oleic, palmitic, glycerides, proteins, protein hydrolysates, amino acids, bile acids, uric acid, pyrrolidone carboxylic acid, sodium acetyl salicylic acid, chlorocrotonic acid, undecylenic acid, sorbic acid, citaconic acid, acrylic acid, and citric acid. In some cases, certain surfactants and other organic materials may be cationic or exhibit amphoteric properties under certain conditions, but if they exhibit anionic properties in the process of the present invention, they will be considered as anionic materials for purpose of the present invention. Examples of preferred detergents which can be removed by the process of the present invention include the alkyl aryl sulfonates such as sodium dodecylbenzenesulfonate, sodium xylene sulfonate, sulfonated glycerines, alkyl phosphates, the alkyl alcohol sulfates, such as sodium lauryl sulfate, soaps, such as, sodium stearate, the $\beta$-alanines and other fatty amino acids and derivatives thereof such as sodium N-lauryl-$\beta$-aminopropionate, disodium N-tallow-$\beta$-imino dipropionate, N-lauryl-$\beta$-aminoprionic acid, and the partial sodium salt of N-lauryl-$\beta$-imino dipropionate. These latter materials are amphoteric in nature, and can be separated by the process of the present invention under certain conditions. Still other surfactants which can be separated by the process of the present invention include diisobutyl sodium sulfosuccinate, alkyl naphthalene sodium sulfonate, sulfonated castor oil, sulfonated tall oil, sulfonated petroleum residuals, salts of sulfated fatty acid ester, perfluro caprylic acid, sodium ligno sulfonate, sodium lauryl sulfoacetate, tetra sodium ethylene diamine tetra acetic acid, sodium salt of alkyl aryl polyether sulfonate, ammonium salt of sulfate ester of an alkyl phenoxy polyethanol, polyoxyethylene sorbitan tall oil ester, sodium methyl oleyl taurate, sodium salt of a sulfonated naphthalene-formaldehyde condensate, terpene fatty acid salt complex, triethanolamine alkyl aryl sulfonate, and ammonium tridecyl benzene sulfonate.

When the two solutions are in contact, the transfer rate is greatly increased when the solutions are mixed. Generally, fairly mild mixing is employed to avoid emulsion formation. If more violent mixing is employed, it is advantageous to employ an apparatus which provides an additional chamber with little agitation so that the separation of the phase may take place. A far better method of increasing the rate of transfer however is by passing an inert gas through the two solutions when they are in contact. When the gas bubble passes through the aqueous solution, the surface active materials concentrate at the gas-liquid interphase. When the gas bubble enters the organic phase, the anionic surfactant is effectively transferred to the polymeric anion exchange material of the present invention. The gas bubble passes through the organic phase and the gas escapes the solution. This process provides the same or a larger amount of transfer of the surfactant to the polymeric anion exchange material as would considerable additional mixing, but without the attendant emulsion formation.

After the transfer of the anionic material has taken place, the aqueous raffinate phase is separated from the loaded organic phase. The aqueous raffinate can then be sewered, reused, or subjected to additional treatment. Because the process of the present invention removes substantially all detergents and many other waste pollutants in the aqueous phase, the aqueous raffinate can be sewered without jeopardizing the purity of the water supply and without the risk of destroying fish and other life in our rivers and lakes. The reuse of the aqueous raffinate is particularly attractive in areas where there is a water shortage, where the aqueous solution still contains valuable components or where the reuse is not affected by small amounts of materials which remain in the aqueous raffinate. Specifically, reuse becomes particularly attractive in laundry operations, industrial cleansing processes, and in industrial manufacturing processes. The loaded organic phase can be stripped of the anionic material by use of suitable stripping agents or, alternatively, it can be employed in some other process or use without change. Generally, where the organic solvent is a hydrocarbon solvent, the loaded organic phase is suitable as a fuel. If the loaded organic phase is stripped of anionic materials, the organic phase is generally recycled to be contacted with further aqueous solutions containing anionic surfactants. The stripped anionic species can be recovered if desired, or destroyed, or reused.

The polymers employed in the present invention, particularly the polyquaternary ammonium compounds, are somewhat difficult to strip using conventional stripping agents. However, because of their excellent ability to extract anionic surfactants, these materials are exceedingly useful in purifying water and in separating anionic detergents.

Exemplary stripping solutions for the polymeric amines include solutions of sodium hydroxide, calcium hydroxide, barium hydroxide, soda, lime, ammonium hydroxide-ammonium chloride buffer, sodium carbonate, disodium hydrogen phosphate-sodium biphosphate buffer, ammonium acetate, sodium bicarbonate-sodium chloride mixture, methylamine, sodium perchlorate, calcium chloride, hydrochloric acid, sulfuric acid and the like. The more difficultly stripped polyquaternaries may be stripped of extracted anionic materials by certain salts such as perchlorates or by strong acids with alcohol. Emulsion formation during the stripping can be effectively countered by the addition of small amounts of additives such as isopropyl alcohol, n-decyl alcohol, dodecyl phenol, silicone fluids, and other de-emulsifying agents. In addition to these solutions, solid stripping agents, usually of a caustic nature such as sodium, calcium, and barium hydroxides, soda, lime and the like may also be used.

It is desirable to perform the extraction of the aqueous solution in the pH range of 6 to 11. One of the distinct advantages of employing the polymeric ion exchange materials of the present invention is that the extraction can be carried out at high pH values not generally feasible with other ordinary ion exchange materials. Sulfuric acid, or any similar acid material may be used to acidify the aqueous solution. However, in many instances no adjustment is necessary when employing the reagents of the present invention.

The process of the present invention can be carried out over a wide variety of temperatures. Generally it is preferred to carry out the process at temperatures in the range of 25 to 75° C. The temperature limits are governed by the freezing and boiling points of the liquid phases. One advantage of the present process is that where the aqueous solution is to be reused, such as in a laundry operation, the process can be carried out without cooling down the aqueous phase, thereby saving considerable amounts of money in heating the water.

A wide variety of gaseous materials can be used as the gas in the process of the present invention. Examples include air, nitrogen, oxygen, hydrogen, helium, neon, argon, methane, ethane, propane, ethylene, propylene, actylene, dichlorodifluoromethane, chlorotrifluoromethane, chlorodifluoromethane, 1,2-dichloro-1,1,2,2-tetrafluroethane, and perflurocyclobutene.

In order to illustrate certain preferred embodiments of the present invention, the following examples are included. Unless otherwise indicated, all parts and percentages used herein are by weight.

Example I

Into a 500 ml. separatory funnel were charged 20 ml. of a 1% solution of a polysecondary amine in kerosene and 200 ml. of an aqueous solution containing 99 mg./l. of a commercially available detergent. The aqueous solution contained 79.5 mg./l. of sodium dodecyl benzene sulfonate. The polysecondary amine employed was prepared according to the method of Example G and had a total amine number of 109.0, of which 18.6% was primary amine, 63.7% was secondary amine, and 7.5% was tertiary amine. The polymer had an iodine value of 81 and an approximate molecular weight of 3100. The pH of the aqueous solution was adjusted to 9.6 and after shaking the two materials in the separatory flask, it was found that 86.2% of the dodecyl benzene sulfonate had been extracted. When this experiment was repeated except at a pH of 4.78, it was found that 99.9% of the dodecyl benzene sulfonate had been extracted.

Example II

Example I was repeated except that a polytertiary amine was substituted for the polysecondary amine of Example I. The polytertiary amine which was used was prepared by the formaldehyde-formic acid methylation of the polysecondary amine of Example I. The polymer had a total amine number of 98.9, a secondary plus tertiary amine number of 98.7, and a tertiary amine number of 95.4. When the extraction was carried out at a pH of 8.44, 24.5% of the dodecyl benzene sulfonate was removed. At a pH of 3.90, 99.9% of the dodecyl benzene sulfonate was removed from the aqueous solution.

Example III

Example I was repeated at pH's of 11.27, 9.73, 7.80, and 5.40. The percent extraction of dodecyl benzene sulfonate for these experiments were 29.9%, 80.8%, 99.4%, and 99.8%, respectively. This illustrates that the polymeric secondary amines is highly effective extractants even at exceedingly high pH's.

Example IV

Example III was repeated at pH's of 11.25, 8.76, 8.70, and 3.45. The percent extraction of the dodecyl benzene sulfonate was 21.4, 41.0, 93.6, and 99.6 respectively. It should be noted that at pH values near 8, the extraction of the dodecyl benzene sulfonate was nearly quantitative.

Example V

Using 200 ml. of a 2% kerosene solution of the polysecondary amine of Example I, 1000 ml. of an aqueous solution containing 87.5 p.p.m. of dodecyl benzene sulfonate was extracted at a pH of 7.2. 97.5% of the dodecyl benzene sulfonate was removed. The aqueous phase was analyzed for kerosene and was found to contain about 28 p.p.m. of kerosene.

Example VI

Using a 2% solution in kerosene of the polysecondary amine of Example I an aqueous solution containing 314 p.p.m. of tripolyphosphate, and 88.75 p.p.m. of dodecyl benzene sulfonate was extracted. The extraction was carried out using 200 ml. of the aqueous solution and 10 ml. of the kerosene solution at various pH's. The results of these experiments are shown in Table I.

TABLE I

| pH | Percent Extraction tripolyphosphate | Percent Extraction DBS |
|---|---|---|
| 9.81 | 0 | 89 |
| 8.02 | 1.9 | 99 |
| 6.38 | 15.9 | 100 |
| 2.45 | 24.8 | 100 |

These results show that both dodecyl benzene sulfonate and polyphosphate can be extracted with the reagents of the present invention. The results also show that dodecyl benzene sulfonate has a stronger affinity for the polysecondary amine than the tripolyphosphate. However, more tripolyphosphate would have been extracted if a greater amount of amine had been present. This fact is illustrated by the following example.

*Example VII*

The aqueous solution of Example VI was extracted with a 3.8% solution of the polymeric secondary amine of Example I in 1,1,2-trichloro-1,2,2-trifluoroethane. 10 ml. of the organic phase was used to extract 200 ml. of the aqueous phase at various pH's. The results of these experiments appear in Table II.

TABLE II

| pH | Percent Extraction tripolyphosphate | Percent Extraction DBS |
|---|---|---|
| 9.50 | 0 | 96.7 |
| 8.23 | 5.09 | 99.5 |
| 7.35 | 24.84 | 99.3 |
| 2.72 | 60.20 | 99.4 |

*Example VIII*

Using a 32.42% kerosene solution of the polymeric secondary amine of Example I, an aqueous solution containing 452 mg./l. of tripolyphosphate was extracted. The extraction was carried out at various pH's using 10 ml. of the kerosene solution for 200 ml. of the aqueous solution. The results of these experiments appear in Table III.

TABLE III

| pH | Percent extraction tripolyphosphate |
|---|---|
| 8.49 | 48.9 |
| 8.07 | 57.5 |
| 8.27 | 63.3 |
| 8.52 | 42.2 |
| 8.64 | 30.3 |
| 5.73 | 99.1 |

These data illustrate that at pH values of below 6 the tripolyphosphate can be quantitatively extracted.

The foregoing examples have been included as illustrations of certain preferred embodiments of the present invention and are not to be construed as limitations on the scope thereof.

The embodiments of the present invention in which an exclusive property or privilege is claimed, are defined as follows:

1. The process of removing organic anionic material from aqueous solutions thereof which comprises: (1) contacting said aqueous solutions with a liquid water-immiscible organic phase comprising an organic solvent solution of a polymer characterized by having 2 to about 40 recurring structural units selected from the group consisting of

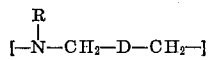

and

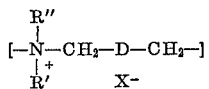

where D is the divalent hydrocarbon radical of dimerized fat acids, said dimerized fat acids having been prepared by polymerizing monobasic aliphatic carboxylic acids having hydrocarbon chains of 8–24 carbon atoms, R is selected from the group consisting of hydrogen, aliphatic radicals having 1 to 20 carbon atoms and aryl radicals having 6 to 20 carbon atoms, R' and R" are selected from the group consisting of aliphatic radicals having 1 to 20 carbon atoms and aryl radicals having 6 to 20 carbon atoms and X is an inorganic salt forming anion, to form a complex in the organic phase of the organic anionic material and the polymer; (2) separating the immiscible organic phase containing the complex from the treated aqueous solution; (3) discharging the treated aqueous solution.

2. The process of claim 1 wherein the separated immiscible organic phase containing the complex is (4) contacted with an aqueous stripping solution to break the complex and extract the organic anionic material into said aqueous stripping solution and the stripped immiscible organic phase containing the polymer is (5) separated from the aqueous stripping solution.

3. The process of claim 2 wherein the stripped immiscible organic phase containing the polymer is (6) (recycled for contacting further quantities of aqueous solutions of organic anionic material.

4. The process of claim 1 wherein the organic anionic material is an organic anionic surfactant.

5. The process of claim 4 wherein the organic anionic surfactant is a sulfonate.

6. The process of claim 4 wherein the organic anionic surfactant is an alkyl sulfate.

7. The process of claim 1 wherein the organic solvent is a hydrocarbon solvent.

8. The process of claim 1 wherein an inert gas is passed through the aqueous solution and the liquid water-immiscible organic phase during the contacting (1).

9. The process of claim 8 wherein the inert gas is air.

10. The process of claim 1 wherein the polymer has the structure

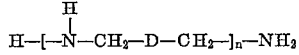

where $n$ is an integer in the range of 2 to about 40.

11. The process of claim 1 wherein the polymer has the structure

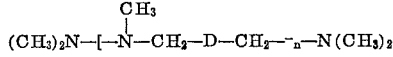

where $n$ is an integer in the range of 2 to about 40.

12. The process of claim 1 wherein the polymer has the structure

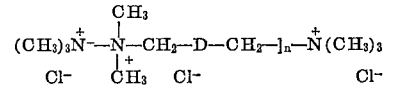

where $n$ is an integer in the range of 2 to about 40.

13. The process of removing organic anionic surfactants from waste water which comprises: (1) contacting said waste water with a liquid water-immiscible organic phase comprising an organic solvent solution of a polymer characterized by having 2 to about 40 recurring structural units selected from the group consisting of

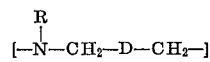

and

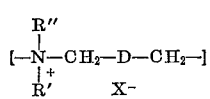

where D is the divalent hydrocarbon radical of dimerized fat acids, said dimerized fat acids having been prepared by polymerizing monobasic aliphatic carboxylic acids having hydrocarbon chains of 8–24 carbon atoms, R is selected from the group consisting of hydrogen, aliphatic radicals having 1 to 20 carbon atoms and aryl radicals having 6 to 20 carbon atoms, R' and R'' are selected from the group consisting of aliphatic radicals having 1 to 20 carbon atoms and aryl radicals having 6 to 20 carbon atoms and X is an inorganic salt forming anion, to form a complex in the organic phase of the organic anionic surfactant and the polymer; (2) separating the immiscible organic phase containing the complex from the treated waste water; (3) discharging the treated waste water; (4) contacting the immiscible organic phase containing the complex with an aqueous stripping solution to break the complex and extract the surfactant into the said aqueous stripping solution; (5) separating the stripped immiscible organic phase containing the polymer from the aqueous stripping solution; and (6) recycling the immiscible organic phase containing the polymer for contacting further quantities of waste water.

14. The process of claim 13 wherein the organic anionic surfactant is a sulfonate, the organic solvent is a hydrocarbon solvent, an inert gas is passed through the aqueous solution and the liquid water immiscible organic phase during the contacting (1) and the polymer has the structure

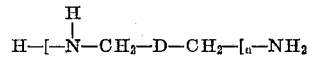

where $n$ is an integer in the range of 2 to about 40

References Cited by the Examiner

UNITED STATES PATENTS

| | | | |
|---|---|---|---|
| 3,074,820 | 1/63 | Kunin | 210—21 |
| 3,123,553 | 3/64 | Abrams | 210—24 |

OTHER REFERENCES

Text, Surface Active Agents, by Schwartz and Perry, copyright 1949, by Interscience Publishers, Inc. (article pages 151–160 relied upon).

MORRIS O. WOLK, *Primary Examiner.*

UNITED STATES PATENT OFFICE
CERTIFICATE OF CORRECTION

Patent No. 3,215,625                            November 2, 1965

Herbert N. Dunning et al.

It is hereby certified that error appears in the above numbered patent requiring correction and that the said Letters Patent should read as corrected below.

Column 5, line 8, for "itmes" read -- times --; column 6, line 43, for "1 1/2" read -- 1 1/2 hours --; column 7, line 32, for "921" read -- 291 --; column 14, lines 52 and 53, the formula should appear as shown below instead of as in the patent:

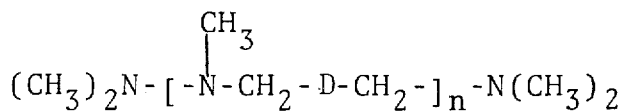

lines 58 to 60, the formula should appear as shown below instead of as in the patent:

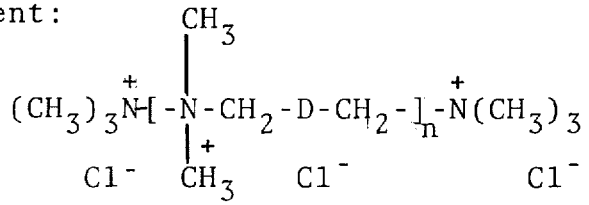

column 16, lines 6 and 7, the formula should appear as shown below instead of as in the patent:

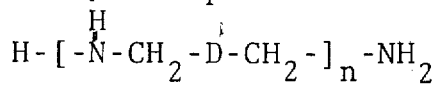

Signed and sealed this 18th day of October 1966.

(SEAL)
Attest:

ERNEST W. SWIDER                            EDWARD J. BRENNER
Attesting Officer                             Commissioner of Paten